July 13, 1954  H. B. SCHULTZ  2,683,633
HYDRAULIC BRAKING SYSTEM
Filed Sept. 14, 1950
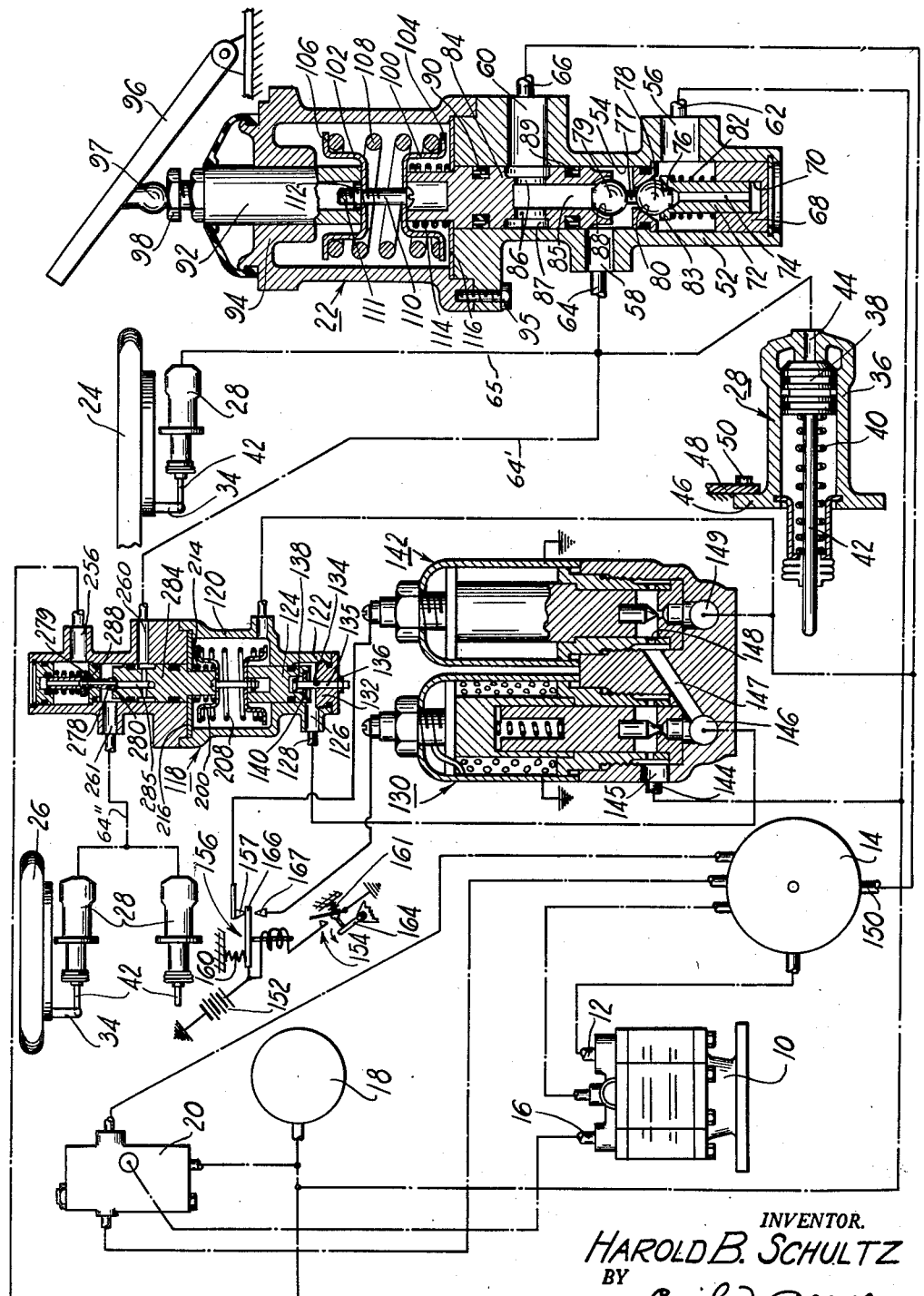
INVENTOR.
HAROLD B. SCHULTZ
BY
Cecil J Arens
ATTORNEY Patented July 13, 1954

2,683,633

UNITED STATES PATENT OFFICE 2,683,633

HYDRAULIC BRAKING SYSTEM

Harold B. Schultz, South Bend, Ind., assignor to Bendix Aviation Corporation, South Bend, Ind., a corporation of Delaware Application September 14, 1950, Serial No. 184,736

4 Claims. (Cl. 303—6.1)

This invention relates to a hydraulic braking system for vehicles.

It is an object of the invention to provide a hydraulic braking system for vehicles wherein a braking force is automatically applied at a reduced pressure upon opening one of the vehicle doors.

Another object of the invention resides in the provision of a vehicle braking system wherein the braking force is automatically varied.

A still further important object of the invention resides in the provision of a vehicle braking system having two mechanisms any one of which is capable of initiating a brake application.

A yet further important object of the invention resides in the provision of a vehicle braking system having one pressure for energizing the brakes under certain prescribed conditions of vehicle operation and a second pressure, different from the said one pressure, which comes into action under other prescribed conditions of operations.

An object of the invention resides in the provision of a vehicle braking system having brakes some only of which are actuable and at a reduced pressure with respect to the system pressure under certain prescribed conditions of vehicle operation and all of which are actuable at the system pressure under other conditions of vehicle operation.

The above and other objects and features of the invention will be apparent from the following description of the apparatus taken in connection with the single figure of the accompanying drawing which forms a part of the specification.

The single figure of the drawing is a diagrammatic representation of one form of the braking system with some of the operating devices shown in section.

Referring now to the drawing, the hydraulic braking system of the invention comprises a pump 10 provided with an inlet 12 in communication with a liquid reservoir 14, and an outlet 16 in communication with an accumulator 18. A pressure regulator or unloading valve 20 is interposed in the system between the accumulator 18 and the reservoir 14 for by-passing liquid under pressure to the latter when the accumulator pressure reaches a preselected value. An operator operated brake valve 22 controls liquid to front and rear wheels 24 and 26 having brake actuators or motors 28. These brake actuators are connected to the brakes of the wheels 24 and 26 in any suitable manner, such as by linkages 34.

The brake actuators are of identical construction and only one will be described in detail. The brake actuator is a single acting motor having a cylinder housing 36, in which a piston 38 is urged toward one end by a spring 40. A piston rod 42 is carried by the piston and protrudes from the other end of the cylinder to be connected to the linkage 34. Said one end of the housing 36 is equipped with an opening 44 for connecting that end with a liquid pressure source, such as the aforesaid accumulator. The housing 36 is formed with a flange 46 for mounting to a vehicle structure 48, by a bolt 50.

The brake control valve 22 comprises a body 52 formed with a bore 54 therein into which inlet, working, and return ports 56, 58, and 60 respectively open. The inlet port 56 communicates with the accumulator through pipe line 62. The working port 58 is connected to the front brake actuators via pipe line 64 and line 65, and to the rear brake actuators via line 64, 64', through interlock valve 118, to be described, and line 64''. The return port communicates with the reservoir 14 by way of pipe line 66. One end of the bore 54 is closed by a plug 68, bored centrally at 70, to receive a valve guide 72, provided with a longitudinal bore 74, in one end of which a conical valve seat 76 is located for supporting one end of a dumbbell valve member 77 having balls 78 and 79. A valve seat 80 is located in the bore 54 between the inlet and working ports. A spring 82, interposed between the plug 68 and an expanded portion 83 of the valve guide, urges ball 78 onto the seat 80. This spring is of sufficient strength to support the weight of plunger 84 and the actuating means therefor to be hereinafter described.

The plunger 84 is slidably arranged in the other end of the bore opposite the valve guide, for axial displacement therein to control the flow of liquid between the ports, and is formed with a longitudinal passage 85 and radial passages 86. A circumferentially located recess 87, is formed in the plunger to provide communication between the longitudinal passage 85 and the return port 60 at all times during plunger movement. A conical seat 88 is formed in the plunger at the end of passage 85 for engagement with the ball 79. Seals 89 and 90 are located on opposite sides of the recess 87 to prevent leakage from the interior of the bore past the plunger to the return port on the one hand, and from the interior of the bore past the plunger to atmosphere on the other hand.

Actuating means for the plunger 84 comprises an actuating sleeve 92 slidably carried in a housing 94, mounted to one end of the body 52 by bolts 95. A pedal or lever 96 overlies the end of the actuating sleeve and is provided with a depending projection 97 rounded at its end for engagement with a recessed portion in the end of an adjusting stud 98, which is threadedly mounted in the end of the sleeve 92. A pair of oppositely disposed cups 100 and 102 fit over adjacent ends of the plunger and actuating sleeve. These cups are formed with flanges 104 and 106. A spring 108 is interposed between the cups so that opposite ends of the spring abut the flanges, tending to urge the cups in opposite directions. A bolt 110 passes through the cups and is provided with a threaded end 111 for receiving a nut 112 which performs the function of preloading the spring 108 to a predetermined value. A spring 114 is interposed between the cup 100 and a washer 116 located at said one end of the bore 54. The height of the free length of this spring is less than the distance from the washer to the underside of the cup 100. This allows for a small mount of free travel of the actuating means and plunger 84 before encountering the spring 114 thus obtaining an increment of valve opening with a light pedal pressure. It will be noted that the actuating means and plunger 84 are supported by the ball 79 which seats in the end of the plunger 84. Obviously with no additional force applied to pedal 96 the upward force required to unseat plunger 84 from the ball 79 must be slightly greater than the downward force caused by the weight of the actuating means and plunger 84.

In vehicles such as busses used for public conveyances, it is a safety requirement to employ means which will bring the bus to a stop when moving and keep the bus from starting when stopped with a door open. If the full braking action of the system were put into operation upon opening a door when the vehicle was traveling at even a moderate speed, the passengers would be thrown out of their seats with the possibility of injury to many not unlikely. To avert such an accident the braking system is equipped with an interlock valve 118, interposed in the hydraulic system between the working port 58 of the brake control valve and the brake actuators 28 for the rear wheels to thus confine the brake action to the rear wheels only and at a reduced pressure, which has been predetermined.

The interlock valve 118 is identical in construction with the brake control valve 22 except that the actuating means of the interlock valve comprises a housing 120 having a tubular extension 122, into which an actuating sleeve 124 is slidably disposed. A radial opening 126 in one end of the tubular extension is adapted to receive a pipe line 128 which communicates with the accumulator 18 via solenoid valve 130. The end of the tubular extension is closed by a plug 132 drilled and tapped at 134 to receive an adjustable stud 135 provided with a locknut 136. The inner end of the stud is upset to form an enlarged portion 138 which engages a washer 140 carried on one end of the actuating sleeve 124, to thereby restrict axial movement of the sleeve in a spring compressing direction. The amount of preload applied to spring 208 is determined by the distance between the bottom side of the head 138 and the washer 140 and is regulated by adjusting the bolt 135 into the threaded portion 134 of the plug 132. With a given adjustment of the bolt 135, the sleeve 124 will move upwardly a predetermined amount under the influence of hydraulic pressure acting on the lower end of the sleeve 124. Movement of the sleeve upwardly, as viewed in the drawing, that is, preloading the spring 208 seats ball 278 on seat 280 and unseats ball 279 from seat 288, thus admitting accumulator pressure to the brake actuators 28 of the rear wheels 26. Hydraulic pressure will continue to build up on these rear brakes until the pressure acting on the top end of the plunger 284 balances the total force on spring 208, at which time the plunger will be moved downwardly, permitting the ball 279 to seat on the seat 288, cutting off the accumulator pressure. It will be noted that the interlock valve is controlled hydraulically while the brake control valve is controlled by an operator manipulating the pedal 96. By selecting a preload for the spring 208 and restricting the axial movement of the actuating sleeve 124 the interlock valve 118 functions as a pressure reducing valve for limiting the hydraulic pressure on the rear brakes. When pressure is relieved from line 128 (closed door position of solenoid valve 130) the ball valve 278 should be clear of seat 280. This may be taken care of by properly weighting plunger 284, but to ensure against sticking of said plunger, a light spring 214 is provided and is interposed between washer 216 and cup 200. Identical parts having, in general, the same function and location in the brake and interlock valves have been given the same reference character plus 200.

Solenoid valves 130 and 142 are of the normally closed type when deenergized and openable upon being energized. Solenoid valve 130 controls the admission of hydraulic pressure to the actuator means of the interlock valve via pipeline 128, and solenoid valve 142 controls the release of hydraulic pressure from said actuator means. A conduit 144 connects inlet 145 of the solenoid valve 130 to the accumulator 18. Outlet 146 of the latter solenoid valve communicates with the interlock valve through the pipe-line 128, aforementioned. A passage 147 connects the outlet 146 with inlet 148 of the solenoid valve 142. The latter solenoid valve having its outlet 149 in communication with the reservoir 14 by way of conduit 150.

The solenoid valves are elements of an electrical system which controls hydraulic actuation of the interlock valve. This interlock valve control means comprises a source of current or battery 152, door switch 154, double acting relay switch 156, normally urged to the position shown on contact 157, by a tension spring 160, to thereby energize the solenoid valve 142, which releases hydraulic pressure from the interlock valve. The door switch 154 is biased to closed position by a compression spring 161. The switch however is opened when door 164 is closed to prevent energization of the solenoid valve 130. Opening the door permits the door switch 154 to close, which actuates the relay switch 156, thus closing blade 166 on contact 167 and energizing the solenoid valve 130.

Operation of the braking system is as follows: Assume that the pump 10 has put the liquid in the accumulator 18 under a prescribed pressure for operating the vehicle brakes. This accumulator pressure acts in ports 56 and 256 of the brake control valve and interlock valves respectively and port 145 of the solenoid valve. In the respective positions of the parts as shown in the drawing, the brakes are released, pedal 96 being up, seat 88 of plunger 84 being clear of ball valve 79, thereby communicating the common brake line 64 with the return or drain line 66 by way of port 58, bore 85 and radial passages 86. Since the pressure has been relieved in line 128, plunger 284 is down to a point where ball valve 278 is off seat 280, and the actuators for the rear brakes are in communication with line 64 by way of line 64'', port 261, passage 285, port 260 and brake line 64'. If the vehicle operator wishes to make a brake application the pedal 96 is depressed, thus moving the plunger 84 downwardly, seating the ball 79 on the seat 88 and unseating the ball 78 from the seat 80 to communicate the brake actuators 28 with accumulator pressure. The hydraulic pressure is communicated to the brake actuators, via the pipe line 64, interposed between the brake actuators and the brake control valve. The pressure on the liquid in the brake actuators will depend on the pedal pressure at 96.

If the brakes should be operated as a result of door 164 being opened, only the brake actuators associated with the rear wheels 26 will be put under a pressure, which will be less than the maximum system pressure. Opening door 164 allows switch 154 to close under the action of the spring 161. This energizes the relay switch 156 which closes on contact 167, thus supplying current to the solenoid valve 130, causing the same to open to thereby admit accumulator pressure to port 126 of the interlock valve. This pressure in port 126 acts on one end of the actuator sleeve 124 moving the same upwardly, causing plunger 284 to seat ball 278, cutting off communication to the brake control valve, and unseating ball 279 from seat 288, thereby communicating the rear wheel brake actuators with the accumulator 18. However, it will be remembered that the actuator sleeve 124 is arranged for limited movement against the load spring 208 and as soon as the pressure acting in the brake actuators and on the upper end of the plunger 284 balances the total force of the spring 208, the ball 278 will seat at 280, cutting off the accumulator pressure. Closing the door 164 opens the door switch 154 and deenergizing the relay switch 156, thus effecting deenergization of solenoid valve 130 and energization of solenoid valve 142. The pressure acting in port 126 and on the end of actuator sleeve 124 is now released to the reservoir 14, via the pipe line 128, passage 147, outlet port 149, and the pipe line 159.

It should be noted that if the brake control valve is operated when the door is open the pressure developed in port 260 will act in the longitudinal bore 285 of the plunger tending to move the same against the spring 208 and hence away from the ball 279. As soon as the pressure in the bore 285 reaches a predetermined value the interlock valve will be overruled by forcing the plunger 284 downwardly to admit the full pressure, developed by the brake control valve, to the rear wheel brakes. This same pressure being applied to the front wheel brakes.

Although this invention has been described in connection with certain specific embodiments, the principles are susceptible of numerous other applications that will readily occur to persons skilled in the art.

Having thus described the various features of the invention, what I claim as new and desire to secure by Letters Patent is:

1. In a motor vehicle having a door and a hydraulic brake system equipped with a reservoir, a first brake actuating mechanism for applying the brakes to at least two of the vehicle wheels, a second brake actuating mechanism for applying the brakes to at least two other of the vehicle wheels, a source of hydraulic pressure, a brake valve for controlling hydraulic pressure to said brake mechanisms, a conduit from the brake valve to the source, a connection from the brake valve to said first brake actuating mechanism, an interlock valve in the connection, a pipeline independent of said brake valve connecting the pressure source to said interlock valve, a connection independent of said interlock valve leading from the brake valve to said second brake actuating mechanism, said brake valve being constructed and arranged to have a first position wherein flow from said source to said first and second brake actuating mechanisms via the brake valve is interrupted and communication between said brake actuating mechanisms and said reservoir is established and a second position wherein said brake actuating mechanisms are in communication with said source via the brake valve and out of communication with said reservoir, said interlock valve being constructed and arranged to have a first position wherein flow from said source to said first brake actuating mechanism via said pipeline is interrupted and communication is established between said first brake actuating mechanism and either the reservoir or the source depending on whether the brake valve is in its first or second position, respectively, said interlock valve having a second position wherein flow from said source to said first brake actuating mechanism via said pipeline is established and communication between said first brake actuating mechanism and said brake valve is cut off, means associated with the interlock valve for positioning the same in its first or second position, a mechanism operatively related to said door and connected to said means to cause said interlock valve to move to be established in its second position when said door is open.

2. A device of the class defined in claim 1 wherein said interlock valve is provided with means for limiting the hydraulic pressure acting on said first brake actuating mechanism to a predetermined value.

3. In a motor vehicle having a door and a hydraulic brake system equipped with a reservoir, a first brake actuating mechanism for applying the brakes to at least two of the vehicle wheels, a second brake actuating mechanism for applying the brakes to at least two other of the vehicle wheels, a source of hydraulic pressure, a brake valve for controlling hydraulic pressure to said brake mechanisms, a conduit from the brake valve to the source, a connection from the brake valve to said first brake actuating mechanism, an interlock valve in the connection, a pipeline independent of said brake valve connecting the source to said interlock valve, a connection independent of said interlock valve leading from the brake valve to said second brake actuating mechanism, said brake valve being constructed and arranged to have a first position wherein flow from said source to said first and second brake actuating mechanisms via the brake valve is interrupted and communication between said brake actuating mechanisms and said reservoir is established and a second position wherein said brake actuating mechanisms are in communication with said source and out of communication with said reservoir, said interlock valve being constructed and arranged to have a first position wherein flow from said source to said first brake actuating mechanism via said pipeline is interrupted and communication is established between said first brake actuating mechanism and the reservoir or the source depending on whether the brake valve is in its first or second position, respectively, said interlock valve having a second position wherein flow from said source to said first brake actuating mechanism via said pipeline is established and communication between said first brake actuating mechanism and said brake valve is cut off, means associated with the interlock valve for positioning the same in its first or second position, a mechanism operatively related to said door and connected to said means to cause said interlock valve to move to said second position when said door is open, said interlock valve being provided with means for limiting the hydraulic pressure acting on said first brake actuating mechanism to a predetermined value subject to being overruled upon movement of said brake valve to its second position.

4. A vehicle brake controlling system as defined in claim 3 wherein the pressure-limiting means of the interlock valve includes a movable valve member which when the door is closed and said brake valve is in its first position is biased to a position effective to release said first brake actuating mechanism, and means becoming effective when the door is opened for automatically subjecting said movable valve member to a predetermined spring force urging it in a direction to communicate said first brake actuating mechanism with the source of hydraulic pressure, at which time said latter pressure upon attaining a predetermined value becomes effective to overcome said spring.

References Cited in the file of this patent

UNITED STATES PATENTS

| Number | Name | Date |
|---|---|---|
| 2,039,705 | Cotter | May 5, 1936 |
| 2,226,671 | Sanford | Dec. 31, 1940 |
| 2,311,806 | Almond | Feb. 23, 1943 |
| 2,318,610 | Hyatt et al. | May 11, 1943 |